United States Patent [19]
Acklin et al.

[11] Patent Number: 5,907,649
[45] Date of Patent: May 25, 1999

[54] COUPLING ARRANGEMENT FOR OPTICALLY COUPLING TOGETHER AN OEIC MODULE AND OPTICAL FIBERS

[75] Inventors: Bruno Acklin, Regensburg; Jan Bellermann, Baldham; Meinrad Schienle, München; Martin Honsberg, Hufschlag; Gustav Müller, München, all of Germany

[73] Assignee: Siemens Aktiengesellschaft, Munich, Germany

[21] Appl. No.: 08/809,671

[22] PCT Filed: Sep. 21, 1995

[86] PCT No.: PCT/DE95/01303

§ 371 Date: Mar. 26, 1997

§ 102(e) Date: Mar. 26, 1997

[87] PCT Pub. No.: WO96/10199

PCT Pub. Date: Apr. 4, 1996

[30] Foreign Application Priority Data

Sep. 26, 1994 [DE] Germany ............................. 44 34 339

[51] Int. Cl.[6] ................. G02B 6/30; G02B 6/12
[52] U.S. Cl. ...................... 385/49; 385/14; 385/50; 385/51
[58] Field of Search ................. 385/14, 41, 49, 385/50, 51

[56] References Cited

U.S. PATENT DOCUMENTS

| 4,729,618 | 3/1988 | Yoshida et al. ............ 350/96.11 |
| 4,784,457 | 11/1988 | Finzel ........................ 350/96.21 |
| 4,836,638 | 6/1989 | Finzel ........................ 350/96.21 |
| 5,123,068 | 6/1992 | Hakoun et al. ............... 385/14 |
| 5,175,781 | 12/1992 | Hockaday et al. ............ 385/49 |
| 5,454,055 | 9/1995 | Kragl et al. ................... 385/14 |
| 5,600,741 | 2/1997 | Hauer et al. .................. 385/35 |
| 5,737,138 | 4/1998 | Someno ........................ 359/900 |

FOREIGN PATENT DOCUMENTS

| 0 264 108 | 4/1988 | European Pat. Off. ......... 350/96.21 |
| 0 532 470 | 3/1993 | European Pat. Off. ......... 385/49 |
| 0 569 981 | 5/1993 | European Pat. Off. ......... 385/49 |
| 36 08 018 | 9/1987 | Germany ...................... 350/96.21 |
| 40 13 630 | 12/1990 | Germany ...................... 385/49 |
| 1-234806 | 9/1989 | Japan ........................... 385/49 |
| WO93/15424 | 8/1993 | WIPO ........................... 385/49 |

OTHER PUBLICATIONS

Hunziker et al, "Self-Aligned Optical Flip-Chip OEIC Packaging Technologies", *Proceedings ECOC'93* (Montreux Switzerland), vol. 1, pp. 84–91, 1993.

*Primary Examiner*—John D. Lee
*Assistant Examiner*—Victoria D. Hao
*Attorney, Agent, or Firm*—Hill & Simpson

[57] ABSTRACT

A coupling arrangement for optically coupling together, in a self-aligning fashion, inputs and outputs of an optoelectronic integrated circuit module and end faces of optical fibers with the module being arranged with a plane support surface flat on a plane bearing surface of a holder for holding fibers and a stopping device is provided for limiting a relative displacement between the module and the holder at a point at which the mutually-assigned end faces and inputs and outputs of the module are situated opposite one another. The electrical contacting of the module is performed by a continuous opening in the holder so that contacts extend through the opening to engage a surface of the module.

15 Claims, 4 Drawing Sheets

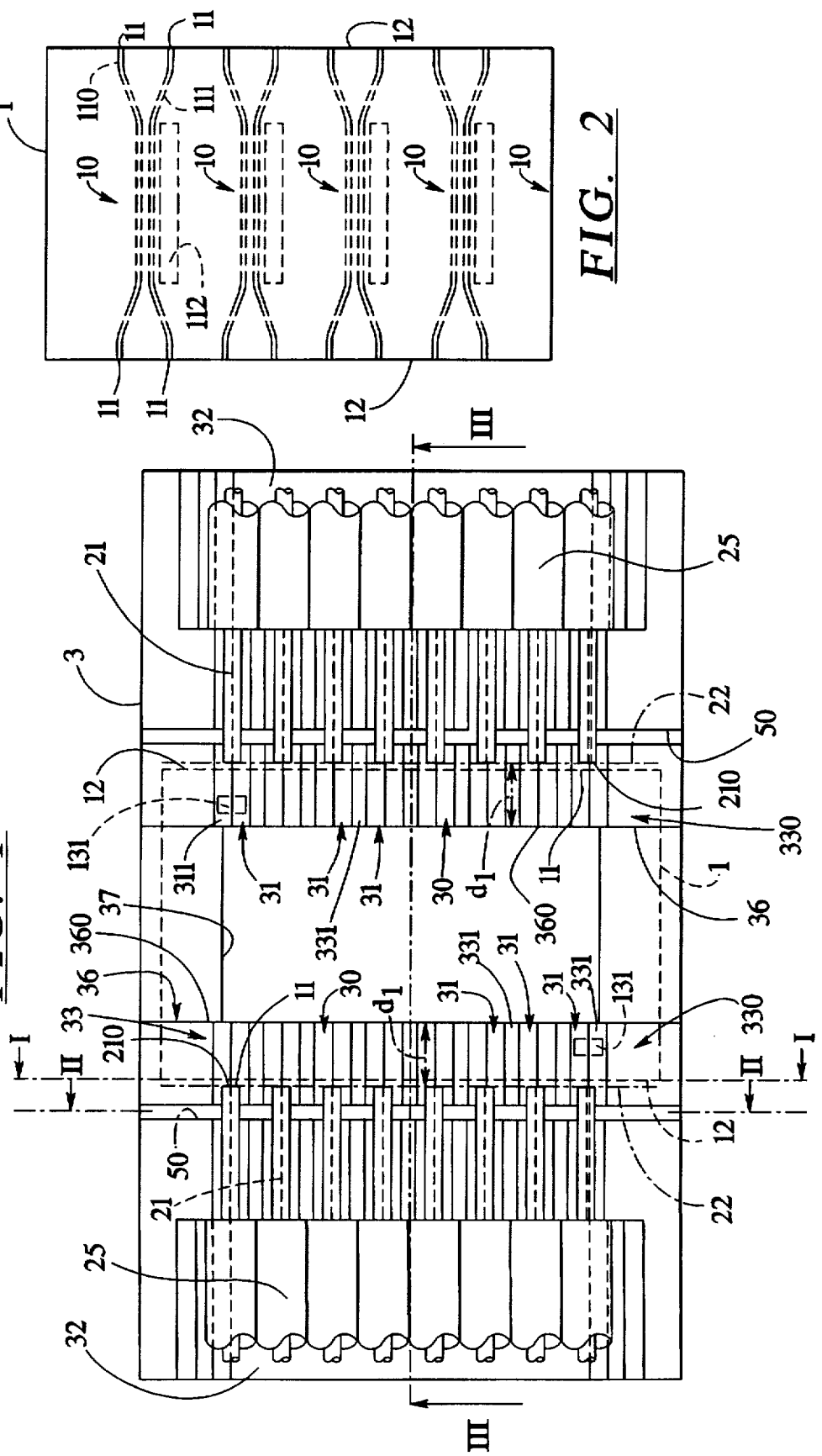

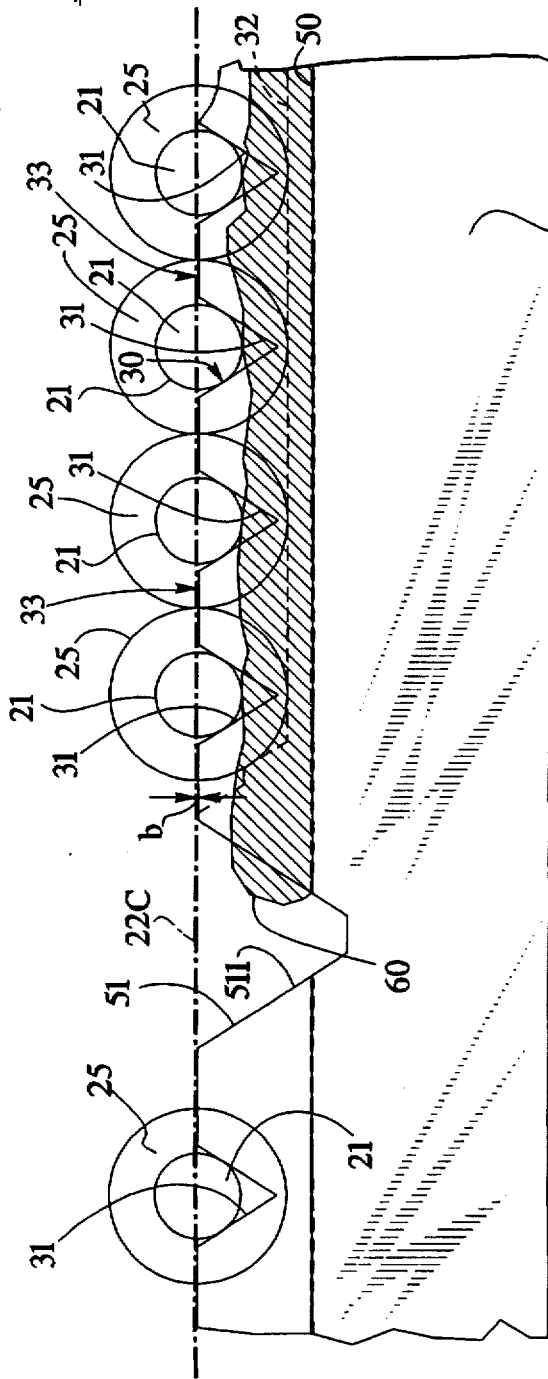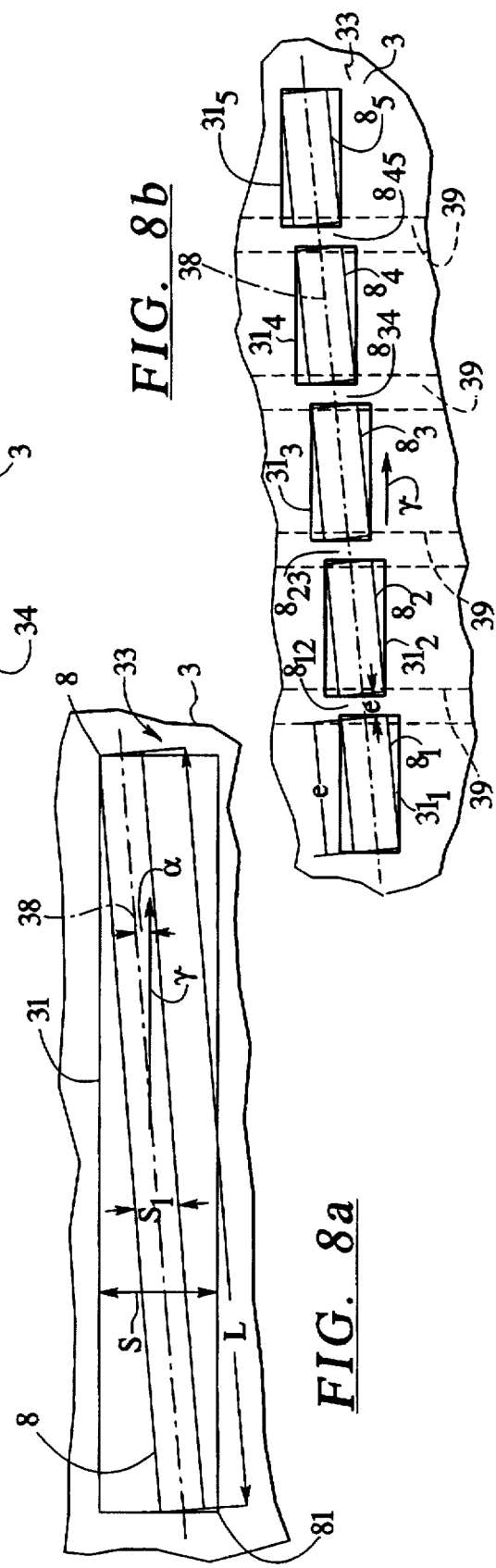

COUPLING ARRANGEMENT FOR OPTICALLY COUPLING TOGETHER AN OEIC MODULE AND OPTICAL FIBERS

BACKGROUND OF THE INVENTION

A coupling arrangement for optically coupling together in a self-aligning fashion optical inputs and/or outputs of an optoelectronic integrated circuit module or OEIC module and end faces of optical fibers is disclosed in an article by W. Hunziker, W. Vogt and H. Melchior: entitled "Self-aligned optical flip-chip OEIC packaging technologies" *Proceedings ECOC'93*. (Montreux, Switzerland), Vol. 1, pages 84 to 91.

In this known coupling arrangement, the inputs and/or outputs of the OEIC module are arranged next to one another on a straight line in at least one plane end surface of the module. The fibers are arranged and held in grooves on a holder, and the end faces, individually assigned to the inputs or outputs, of these fibers are arranged next to one another identically orientated on a straight line in a common plane.

The OEIC module has a surface which is perpendicular to the end surfaces of the inputs and/or outputs and parallel to the straight line of the inputs and/or outputs.

The holder has a surface which is perpendicular to the plane of the end faces of the fibers in the groove and parallel to their straight line and in which the grooves are arranged.

The OEIC module is arranged on the holder such that its plane surface faces the plane surface of the holder.

In order to arrange the OEIC module on the holder, there are constructed on the plane surface of the module one or more projections each of which is assigned to a groove of the holder. The module is mounted on the holder such that the projection or projections project into the assigned grooves and bear against lateral limiting surfaces of the grooves which are mutually opposite and at an oblique angle to one another, the plane surface of the module being arranged at a spacing from the plane surface of the holder.

It is set up such that in the case of the module mounted in such a way on the holder the mutually assigned end faces of the optical fibers and the inputs and/or outputs of the module are automatically arranged in the correct position relative to one another, that is to say are mutually opposite coaxially.

Electric contacts, which are soldered resiliently on the plane surface of the holders are provided for the purpose of electrically contacting the OEIC module.

SUMMARY OF THE INVENTION

The invention is directed to providing different type of self-aligning optical coupling together of optical inputs and/or outputs of an OEIC module and end faces of optical fibers, and at a different type of electrical contacting of this module on a holder on which the optical fibers are arranged and held in grooves.

The different type of self-aligning optical coupling together is achieved by means of the coupling arrangement for optically coupling together, in a self-aligning fashion, optical inputs and/or outputs of an optoelectronic integrated circuit module and end faces of optical fibers, said arrangement comprising an optoelectronic integrated circuit module having inputs and outputs being arranged next to one another in at least one plane end surface of the module on a straight line; a holder having parallel-extending grooves for receiving the fibers with the end faces of the fibers, which are to be assigned to individual inputs and outputs of the modules, being arranged next to one another identically oriented in a common plane on a straight line, said module having a flat support surface which extends perpendicular to the end surface and parallel to the straight line of the inputs and outputs, said holder having a region in front of the end faces providing a bearing surface, which extends perpendicular to the plane of the end faces and is parallel to the straight line, said bearing surface receiving and supporting the flat support surface of the module with an end surface of the module situated opposite and extending parallel to the plane of the end faces of the fibers, a vertical spacing of the straight line of the input and output fibers from the support surface of the module being equal to the vertical spacing of the straight line of the end faces from the bearing surface of the holder; and a stopping means or device being provided for limiting a relative displacement between the module and the holder when the support surface of the module is disposed on the bearing surface of the holder in a direction parallel to the straight line of the inputs and outputs and the straight line of end faces of the fiber at a point in which the end faces and the inputs and outputs are assigned to one another and opposite each other.

It is essential in this case that the optoelectronic integrated circuit or OEIC module has a plane support surface and the holder has a plane bearing surface on which the support surface of the module is supported flat and a stopping device is provided for limiting a lateral relative displacement between the module and holder and which permits the correct self-aligning arrangement of the mutually assigned end faces and inputs and/or outputs relative to one another. The flat support of the module on the holder requires a less precise prepositioning and is very stable, and the position of the optical field relative to the bearing surface can be set very precisely.

Preferred and advantageous embodiments of the coupling arrangements have a holder with the bearing surfaces being sub-divided into two bearing surface sections separated by a depression and assigned to mutually opposite end faces of the module with one section supporting a portion of the flat support surface of the module adjacent one end surface and another section supporting a portion of the flat support surface of the module adjacent the opposite end surface of the module.

The stopping means or device preferably comprises a lateral limiting surface of a groove constructed in the bearing surface and a projection constructed on the flat support surface of the module and arranged to be received in this groove. It is thus possible for the limiting surface and the projection to be brought into contact with one another by relative displacement of the module on the holder in the direction of the straight line of the inputs and outputs and the end faces.

The fibers are preferably arranged and fastened in the grooves, which are constructed and dimensioned in a plane surface of an auxiliary holder, so that circumferential surfaces of the fibers arranged in the grooves touch lateral limiting surfaces of the grooves of the auxiliary holder and project from the flat surface of the auxiliary holder. The grooves of the auxiliary holder can be brought into coincidence with the grooves arranged in the plane of the first-mentioned or main holder in such a way that the circumferential surfaces of the fibers in the assigned grooves of the auxiliary holder project into the grooves of the main holder and touch the lateral limiting surfaces of these grooves. The grooves of the main holder and the auxiliary holder have mutually opposite lateral limiting surfaces, which extend obliquely at an angle to one another.

The other type of electric contacting is achieved by means of a coupling arrangement according to the invention has the holder having a continuous opening provided between support surface sections of the holder, which opening allows electrical contacts to be placed on a bottom or rear surface of the module. It is essential that the invention as claimed in claim 6. It is essential that the electric contacting is performed from the rear side of the holder, thus permitting the possibility of uncomplicated contacting by means of wire bonding. The contacting possibility according to the invention is not limited to coupling arrangements mentioned hereinabove, but can be applied generally in optical coupling arrangements.

Holders which are advantageous for the coupling arrangements, as mentioned hereinabove, but are not as claimed in claims 1 to 5 but are not limited to these arrangements and which have grooves in which fibers are to be arranged and fastened follow from a holder having one or more grooves, which are constructed in a plane surface of the holder and extend next to one another. Fibers can be arranged and be fastened in the grooves of the holder and a trench is constructed in the surface of the holder to extend transversely across the grooves. This trench can be formed by sawing. In addition to this trench, an additional, second or further trench, which extends between neighboring grooves and transverses the first-mentioned trench, can be provided and extends into the surface to a greater depth than the first-mentioned trench. This additional trench can be constructed in the form of a groove having mutually opposite lateral limiting surfaces arranged obliquely at an angle to one another.

To aid in positioning fibers, each of the holders may be provided with a trough-like depression extending transverse to the grooves for receiving and fastening fibers cladded with the protective cladding, which cladding is removed from a portion of the fibers that are received in the grooves of the holder.

The grooves of the holder can be produced by a plurality of groove sections, which are arranged in a specific direction and succeed one another in this direction with a lateral offset while being parallel to one another. These grooves form a straight line which extends at an angle to the specific direction. The neighboring groove sections are separated from one another by a trench-like depression, which is situated between the groove sections and extends transverse to both the specific direction and the straight line. These trench-like depressions can be formed by sawing.

Other advantages and features of the invention will be readily apparent from the following description of the preferred embodiments, the drawings and claims.

BRIEF DESCRIPTION OF THE DRAWINGS

FIG. 1 is a plan view of a holder of a self-aligning coupling arrangement according to the invention and having contacting on the rear side, in which the position of the OEIC module is illustrated by dashes, FIG. 2 is a plan view of an example of an OEIC module on whose underside four switchable optical directional couplers are constructed, FIG. 6 is a cross sectional view taken along the line II—II in FIG. 1 through a holder perpendicular to the bearing surface and along a trench, which transversely severs the grooves of the holder, for introducing an adhesive for fastening the fibers in the grooves, FIG. 8a is a partial plan view of a continuous groove in a surface of a holder and a mask which extends at an angle to the groove; and FIG. 8b is a partial plan view of a groove divided into sections in a surface of the holder and mask sections which extend at an angle to the groove sections.

DESCRIPTION OF THE PREFERRED EMBODIMENTS

Figure 3:
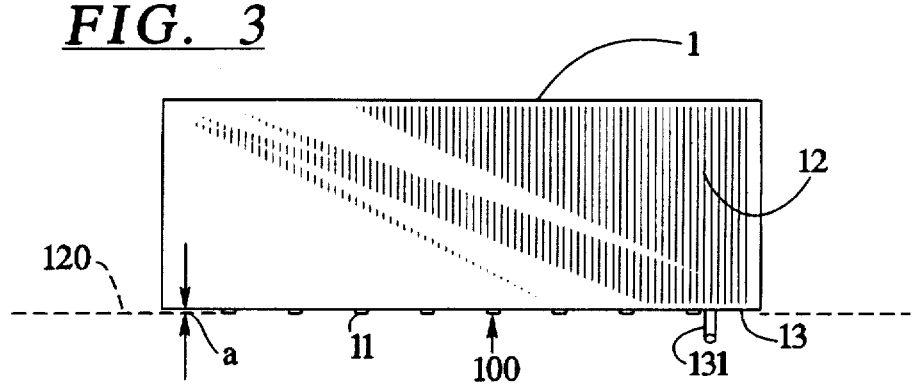
FIG. 3 is an elevational view of an end surface of the module according to FIG. 2.

The holder 3, represented in plan view in FIG. 1, of a coupling arrangement according to the invention for optically coupling together in a self-aligning fashion optical inputs and/or outputs of an OEIC module 1 and end faces of optical fibers 21 has a plane bearing surface 33, lying in the plane of the drawing, for examples which comprises, for example, two bearing surface sections 330 separated from one another by a depression 36 in the holder 3.

Figure 4:
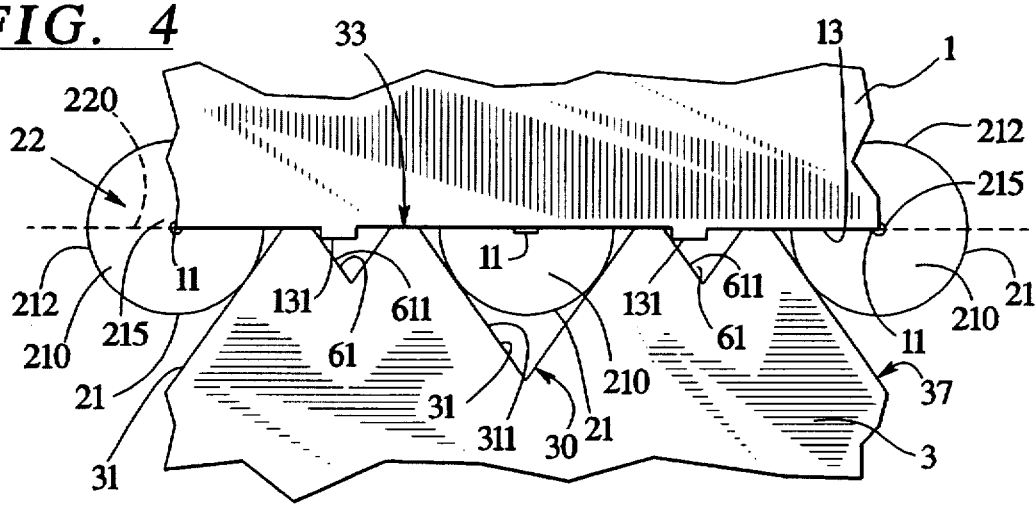
FIG. 4 is an elongated partial cross sectional view taken along the line of section I—I in FIG. 1, perpendicular to the bearing surface of the holder with a special feature that separate grooves are provided for the stopping device according to the invention.

Constructed in each bearing surface section 330 is a series 30 of grooves 31 extending parallel next to one another, in which fibers 21 to be coupled are arranged and held in such a way that and faces 210 of these fibers 21 are arranged next to one another identically orientated in a common plane 22, perpendicular to the plane of the bearing surface 33, on a straight line 220 (see, for example, FIG. 4).

The end faces 210 of the fibers of each bearing surface section 330 are arranged at a spacing $d_1$ (FIG. 1) from a boundary edge 360 of the depression 36, which bounds said bearing surface section 330 and is, for example, parallel to the straight line 220 of the end faces 210. The grooves 31 of this bearing surface section 330 extend as far as said boundary edge 360.

Each bearing surface section 330 comprises plane two-dimensional strips 331 which lie in the plans of the drawing and separate neighboring grooves 31 from one another.

An OEIC module 1 is to be mounted with its support surface 13 (see FIGS. 3 and 5) flat on the bearing surface 33 in the way indicated by dashes in FIG. 1. This means that the module 1, having two mutually opposite end surfaces 12, is to be mounted with its support surface 13 flat on the bearing surface 33 such that a section, bordering on an end surface 12, of said support 13 is supported flat on an assigned bearing surface section 330, and a section, bordering on the other end surface 12, of the support surface 13 is supported flat on the other bearing surface section 330. The end surfaces 12, which are perpendicular to the support surface of the module 1 and parallel to one another, are perpendicular to the bearing surface 33 of the holder 3 in the case of the module 1 supported in this way on the holder 3.

The module 1 is, moreover, to be arranged such that each end surface 12 is parallel to the plane 22 in which the mutually opposite fiber ends 210 assigned to this and surface 12 lie.

Moreover, the module 1 is to be arranged such that exactly opposite each fiber and 210 is an input and/or output 11 located in the end surface 12, assigned to said fiber end 210, of said component 1.

This is achieved according to the invention by means of a stopping device which can limit a relative movement between the OEIC component 1 supported with its support surface 13 flat on the bearing surface 33, and the holder 3 in a direction parallel to the plane 22 of the assigned fiber end faces 210 and to the bearing surface 33 at a point at which mutually assigned end faces 210 and inputs and/or outputs 11 are opposite one another.

It is assumed in this case that the inputs and/or outputs 11 of the OEIC module 1 which are arranged in an end surface 12 are arranged next to one another on a straight line 120 parallel to the support surface 13 of said module (see FIG. 3) and the vertical spacing a of this straight line 120 from the support surface 13 is equal to the vertical spacing b (see FIG. 6) of the straight line 220 of the end faces 210 from the bearing surface 33 of the holder 3.

The stopping device (see FIG. 1) comprises, for example, a groove 31 and a projection 131 which is constructed on the support surface 13 of the module 1 and fits with play into said groove 31. The stop 131 is dimensioned and arranged relative to the groove in such a way that in the case of a relative displacement of the module 1 and holder 3 parallel to the planes 22 of the end faces 210 of the fibers 21, the stop 131 comes into contact with a lateral limiting surface 311 of the groove 31, and in the process stops the relative movement at a point at which the inputs and/or outputs 11 of the module 1 are respectively exactly opposite an end face 210 of an assigned fiber 21.

An example of an OEIC module 1 in a plan view from above or onto an end face is represented in FIGS. 2 and 3. In this example, the support surface 13 is the underside of the module 1.

Constructed in this module 1 on the support surface 13, for example, are four generally known switchable optical directional couplers 10 which, together in each case with a control electrode 112 assigned to each directional coupler 10, are represented by dashes, since they are located on the underside of the module 1, which is averted from the top side.

Each directional coupler 10 comprises two optical strip waveguides 110 and 111 which are integrated on the module 1 and terminate in the two mutually opposite end surfaces 12 of the module 1 and extend parallel to one another in a middle section at a slight spacing such that an optical wave guided in one of said two waveguides 110 and 111 can be transferred into the other waveguide, it being possible for the transfer to be controlled as a function of a control voltage which is to be applied to a control electrode 112 arranged in the middle section next to the waveguides 110 and 111.

Each end face, lying in one of the two end surfaces 12 of the module 1, of a strip waveguide 110 and 111 defines an input and/or output 11 of the module 1. These end faces 11 are arranged on the line 120 which is parallel to the support surface 13 and to the relevant end surface 12. The vertical spacing a of this line 120 from the support surface 13 is very small, because the strip waveguides 110 and 111 are located directly on the support surface 13, and is in the micrometer or submicrometer range. The spacing a could in principle also be 0.

With regard to an accurate alignment of the inputs and outputs 11 and end faces 210 of the fiber 21 relative to one another, it is essential that the spacing b of the line 220 (see FIG. 6) on which the central axes of the fibers 21 in the end faces 210 of these fibers are located, is equal to the spacing a from the bearing surface 33 of the holder 3, since when the module 1 is mounted flat on the holder 3 as described these two lines 120 and 220 are then situated at the same level with reference to the bearing surface 33.

Once the module 1 has been mounted in the described fashion on the holder 3, and up to when the projection 131 bears against a lateral limiting surface 311 of the assigned groove 31, the mutually assigned inputs and/or outputs 11 and end faces 210 are automatically aligned, and the module 1 can be fixed in this position on the holder 3.

Provided for the purpose of contacting the module 1 fixed on the holder 3 is a continuous opening 37 (see FIG. 5) which extends in the region of the module 1, for example in the region of the depression 36, as far as a rear side 34, averted from the module 1, of the holder 3, and by means of which the module 1 can be electrically contacted from this rear side 34, for example by wire bonding.

Figure 5:
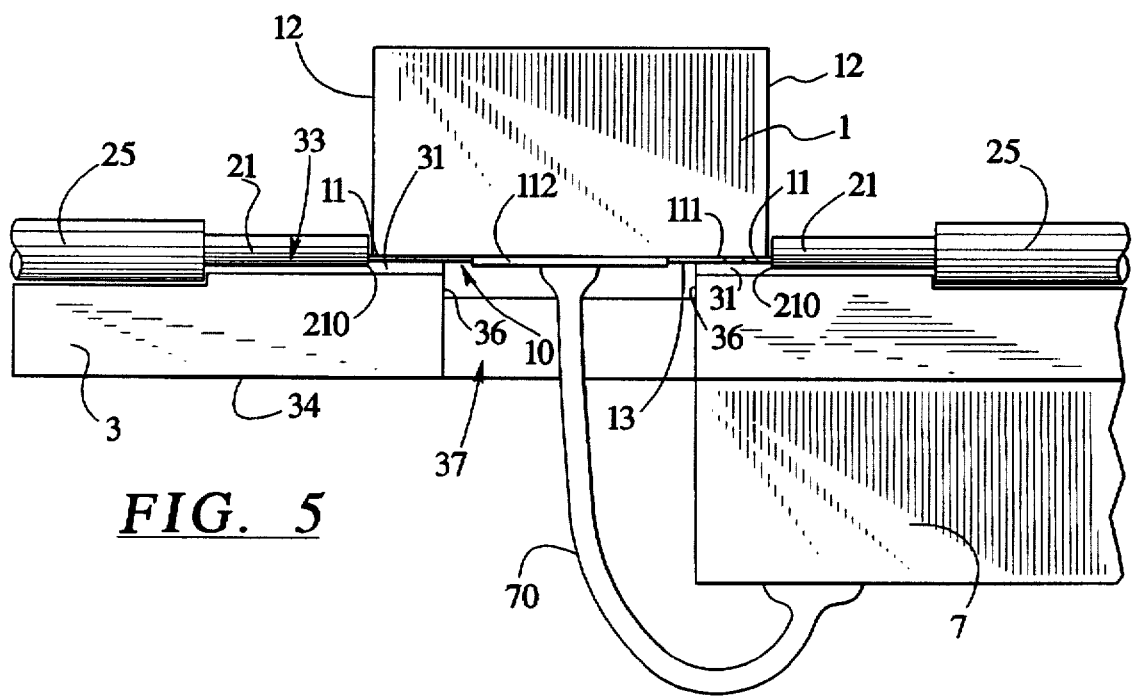
FIG. 5 is a longitudinal cross sectional view with portions in elevation taken along a line III—III of FIG. 1 through an the holder perpendicular to the bearing surface with the OEIC module being mounted and electrically contacted in accordance with FIGS. 2 and 3.

In the longitudinal section shown in FIG. 5, an electrode 112 of a directional coupler 10 is, for example, electrically connected by means of a bonding wire 70 to a wiring backplane 7 on which, for example, the holder 3 is arranged.

A projection 131 on the support surface 13 of a module 1 can be arranged in a groove 31 in which a fiber 21 is held as indicated in FIG. 1. With regard to an undisturbed propagation of light between an end face 210 of a fiber 21 and an assigned input and/or output 11, it is, however, expedient to arrange such a projection 131 in a separate groove 61 (see FIG. 4) in which no fiber 21 is arranged and held. Such a groove 61 can, for example, be arranged between neighboring grooves 31 and have smaller cross-sectional dimensions than the grooves 31. The only essential thing is that the projection 131 fits with play into the groove 61 and can be brought by means of displacement in contact with a lateral limiting surface 611 of the groove 61.

Figure 7:
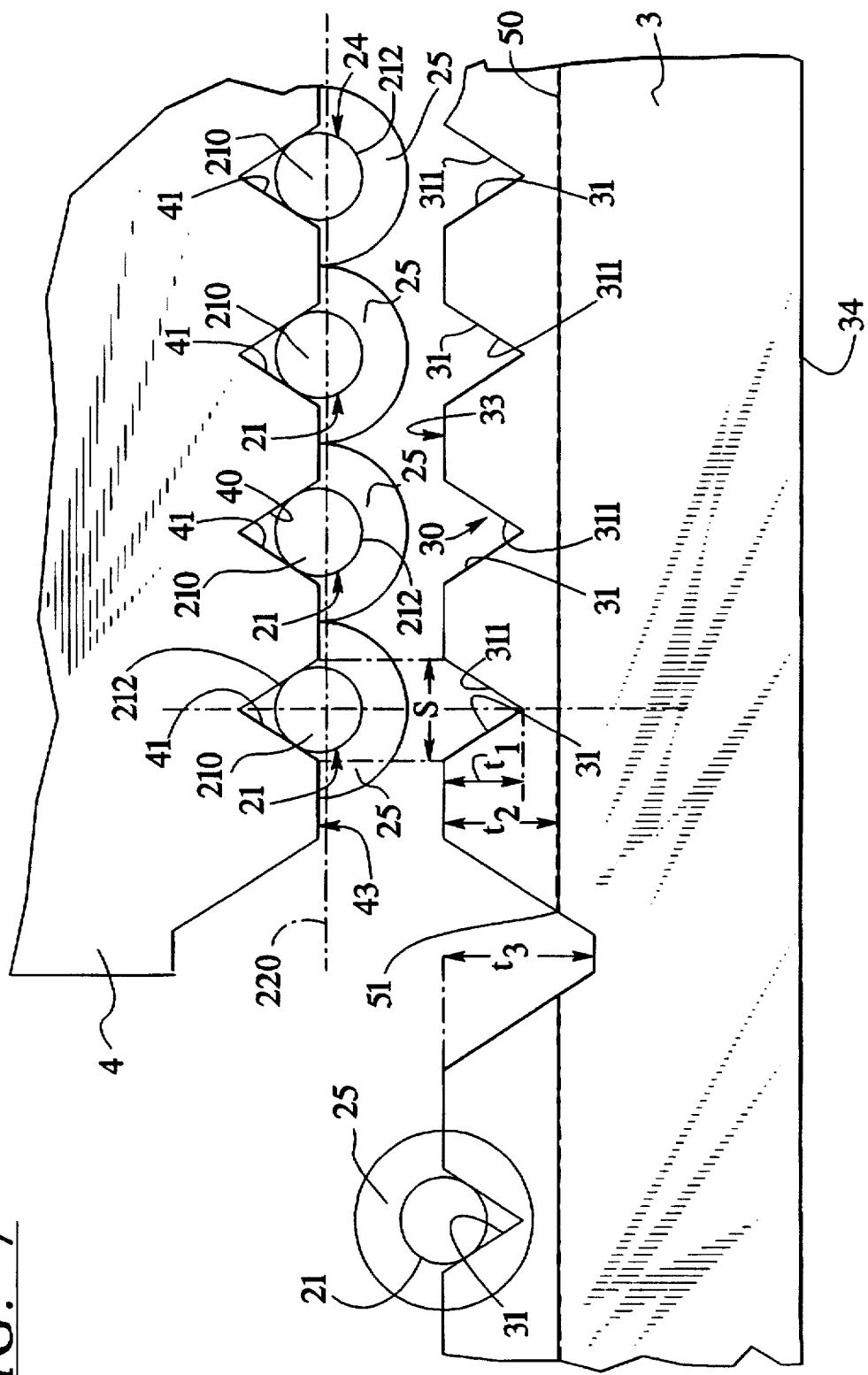
FIG. 7 is a cross sectional view corresponding to the cross sectional view of FIG. 6 through a holder and through an auxiliary holder which holds fibers and which is to be mounted on the holder so that the fibers are arranged in the grooves of the holder.

In order to fasten the fibers 21 in the grooves 31 of the holder 3, it is expedient to construct in the bearing surface 33 a trench 50, (see FIGS. 1 and 6) which transversely severs the grooves 31, for introducing an adhesive 60 (see FIG. 6), for fastening the fibers 21 in the grooves 31, which trench extends from the bearing surface 33 to a greater depth $t_2$ than the grooves 31, which have a smaller depth $t_1$ (see FIG. 7). Such a trench 50 permits the adhesive 60 to be drawn in automatically and uniformly distributed by means of capillary forces. The adhesive 60 can, for example, be an epoxy adhesive. The trench 50 itself can be produced by sawing.

It is also expedient to construct in the bearing surface 33 a second, additional or further trench 51, which extends between neighboring grooves 31 and transverse to the trench 50, and into which the one trench 50 opens and which extends from the surface 33 to a greater depth $t_3$ than the one trench 50. Such a further trench prevents the adhesive 60 from overflowing to grooves 31 which are situated beyond this further trench and in which fibers 21 are to be fastened, but not, for example, simultaneously with the fibers 21 to be fastened on the near side of the further trench 51.

A further or second trench 51 can also serve the purpose of separating from one another holder sections which have parallel grooves 31 for fastening fibers 21, and which are severed from the holder in the region of the further trench 51, in order to form holders 3 according to FIG. 1.

It is also very often expedient to arrange and to fasten the fibers 21 in grooves 41 of an auxiliary holder 4, which grooves are constructed and dimensioned in a plane surface 43 of the auxiliary holder 4 in such a way that the circumferential surface 212 of the fibers 21 arranged in the grooves 41 touch lateral limiting surfaces 411 of the grooves 41 and project from the plane surface 43 of the auxiliary holder 4, as is represented in FIG. 7.

The grooves 41 of the holder 4 can be brought into coincidence with the grooves 31, arranged in one plane, of the holder 3 in such a way that the circumferential surface 212 of each fiber 21 in an assigned groove 31 of the holder 3 projects into the groove 31 and touches the lateral limiting surfaces 311 of the groove 31. The auxiliary holder 4 can be of identical construction to the holder 3 and be a section of the holder which is severed from a larger holder in a further trench 51. Consequently, the auxiliary holder 4 can also have a trench 50 for introducing an adhesive.

The separate preassembly of the fibers 21 on an auxiliary holder 4 increases the yield and permits the fibers 21 to be fixed on both sides.

All the grooves 31, 41 and 61, and also the further trench 51 are preferably constructed such that they have mutually opposite, lateral limiting surfaces 311, 411, 611 and 511, respectively, which are respectively arranged obliquely at an angle to one another. Such limiting surfaces are obtained, for example, in the production of grooves by preferred etching in silicon. Consequently, the holder 3 preferably consists of silicon, while the module 1 preferably has a substrate made from an electrooptical material, for example InP.

A groove having lateral limiting surfaces arranged at an angle relative to one another can have a V-shape or a U-shape.

In the case of a realized exemplary embodiment of a holder 3 or auxiliary holder 4 made from silicon for a coupling arrangement according to the invention, in which the V-shaped or U-shaped grooves 31 and 41, respectively, and the further trench 51 have been produced by anisotropic etching, the grooves 31 or 41 had an opening width s of approximately 153 $\mu$m and a depth $t_1$ of approximately 108 $\mu$m, and the further trench had a depth $t_3$ of approximately 150 $\mu$m. The sawn trench 50 had a depth $t_2$ of approximately 130 $\mu$m. The fibers 21 were known monomode glass fibers with a typical diameter of 3 to 8 $\mu$m for the core 215 (see FIG. 4) and a diameter of the circumferential surface 212 of, typically, 100 to 150 $\mu$m.

The fibers 21 to be fastened are usually surrounded by a protective cladding 25. The protective cladding 25 is removed from the fibers 21 in the region of the grooves 31. In order not to place a mechanical load on the brittle fibers 21 which are freed from their protective cladding 25, a trough-like depression 32 (see FIG. 1) extending transverse to the grooves 31 on the side of the grooves 31 averted from the module 1 is provided for receiving and fastening the fibers 21 clad with the protective cladding 25, in which depression the protective cladding 25 is accommodated and can be anchored by means of adhesive, for example. In the realized exemplary embodiment, the depth of the depression 32 was approximately 150 $\mu$m.

If, during the preferred etching of the grooves 31, 41 or 61, the mask, elongated in the shape of a strip, is not situated parallel to the crystal axis of the silicon, widening can occur during the preferred etching of long grooves, as is indicated in FIG. 8a with reference to the example of a groove 31. The mask 8 of width $s_1$ and length L is at an angle $\alpha$ to the direction r in which the groove 31 is constructed from silicon during the preferred etching of the surface 33 of the holder 3. The opening width a of this groove 31 is determined by the spacing, measured perpendicular to the direction r, between the left-hand lower corner 81 and the right-hand upper corner 83 of the mask 8. The longer the length L of the mask 8, the greater is the width s of the groove 31 produced.

In order to keep the width s of the groove 31 small, use is made not of a continuous mask 8, but of a mask interrupted once or several times in accordance with FIG. 8b and comprising mask sections $8_1$, $8_2$, $8_3$, $8_4$ and $8_5$ arranged one behind another in the direction of the central axis 38 at a spacing e. Each of these mask sections $8_1$ to $8_5$ produces a groove section $31_1$, $31_2$, $31_3$, $31_4$ and $31_5$, respectively, which, because of the short length l of this mask section, has a lesser width s than the groove 31 produced by the long mask 8 in accordance with FIG. 8a.

The groove sections $31_1$ to $31_5$ produced are arranged following one another in the direction r and offset laterally in parallel with respect to one another, and arranged on the central axis 38 of the mask sections $8_1$ to $8_5$, which axis extends at an angle $\alpha$ to the direction r. Neighboring groove sections $8_1$ and $8_2$ or $8_2$ and $8_3$ or $8_3$ and $8_4$ or $8_4$ and $8_5$ are separated by webs $8_{12}$, $8_{23}$, $8_{34}$ and $8_{45}$ respectively, extending transverse to the groove sections. In order to be able to insert a fiber 21, neighboring groove sections $8_1$ and $8_2$ or $8_2$ and $8_3$ or $8_3$ and $8_4$ or $8_4$ and $8_5$ are separated from one another by a trench-like depression 39 which is situated therebetween, extends transverse to the direction r and to the axis 38, removes the webs $8_{12}$, $8_{23}$, $8_{34}$ and $8_{45}$, respectively, and is indicated in FIG. 8b by dashes. Such a trench-like depression 39 can be produced by sawing.

We claim:

1. An arrangement for optically coupling together, in a self-aligning fashion, optical inputs and outputs of an optoelectronic integrated circuit module and end faces of optical fibers, said arrangement comprising a plurality of fibers having end faces; an optoelectronic integrated circuit module having inputs and outputs being arranged next to one another in at least one plane end surface of the module on a straight line; and a holder having a planar surface with parallel-extending grooves for receiving the fibers with the end faces of the fibers, which are to be assigned to the individual inputs and outputs of the module, being arranged next to one another identically oriented in a common plane on a straight line, said module having a flat support surface which extends perpendicular to the end surface and parallel to the straight line of the inputs and outputs, said holder having a region in front of the end faces provided with a bearing surface which extends perpendicular to the plane of the end faces of the fibers and being parallel to the straight line, said bearing surface receiving and supporting the flat support surface of the module, with the end surface of the module situated opposite and extending parallel to the plane of the end faces of the fibers, a vertical spacing of the straight line of the input and output fibers from the flat support surface of the module being equal to the vertical spacing of the straight line of end faces for the fibers from the bearing surface of the holder, and said planar surface of the holder having a transversely extending trench which crosses the grooves at a space from the region of the bearing surface, said trench providing means for introducing an adhesive for fastening the fibers in the grooves and having a depth greater than the depth of the grooves.

2. An arrangement according to claim 1, wherein the bearing surface of the holder has two bearing surface sections, which are separated from one another by a depression in the surface of the holder, each section being assigned to a mutually opposite end portion of the module, with one section supporting a portion of the flat support surface of the module adjacent one end surface and the other section supporting a portion of the flat support surface of the module adjacent an opposite end surface of the module. arranged to be received in the groove, so that it is possible for the limiting surface and the projections to be brought into contact with one another by relative displacement of the module and the holder in a direction parallel to the straight lines of the inputs and outputs and the end faces.

3. An arrangement according to claim 1, which includes an auxiliary holder having parallel-extending grooves, which have lateral limiting surfaces which are constructed to receive the circumferential surfaces of the fibers disposed in the grooves, with a portion of the fibers extending from a flat surface of the auxiliary holder, said grooves of the auxiliary holder being arranged to coincide with the grooves of the first-mentioned holder so that the projecting portions of the circumferential surfaces of the fibers are received and touch the lateral limiting surfaces of the grooves of the first-mentioned holder.

4. An arrangement according to claim 3, wherein the lateral limiting surfaces of the grooves extend obliquely at an angle to one another.

5. An arrangement according to claim 1, wherein the grooves have limiting surfaces extending obliquely at an angle to one another.

6. An arrangement according to claim 1, wherein the holder has a continuous opening which extends to a rear side of the holder adjacent the bearing surface so that electrical contacts from a rear surface can be made on the module.

7. An arrangement according to claim 1, wherein the trench is produced by sawing.

8. An arrangement according to claim 1, wherein the holder has a second trench which extends between a pair of neighboring grooves and crosses the first-mentioned trench, said second trench having a greater depth than said first-mentioned trench.

9. An arrangement according to claim 8, wherein the second trench is constructed in the form of a groove having mutually opposed lateral limiting surfaces arranged obliquely at an angle to one another.

10. An arrangement according to claim 1, wherein the bearing surface has a trough-like depression extending transverse to the grooves for receiving and fastening fibers cladded with a protective cladding, which cladding has been removed from the fibers in the region of said grooves.

11. An arrangement according to claim 1, wherein each of the grooves in the bearing surface of the holder is formed by a plurality of groove sections, which are arranged along a straight line extending at an angle to a specific direction with one section following the other section in said direction and being laterally offset and parallel with respect to one another.

12. An arrangement according to claim 11, wherein the neighboring groove sections are separated from one another by a trench-like depression in the surface of the holder extending therebetween and extending transverse to the specific direction and the straight line.

13. An arrangement according to claim 12, wherein each of the trench-like depressions is formed by cutting.

14. An arrangement according to claim 1, which includes stopping means for limiting relative movement, said stopping means comprises a lateral limiting surface of a groove constructed in a bearing surface of the holder and a projection constructed on the flat support surface of the module and arranged to be received in the groove, so that as the limiting surface and the projection are brought into contact with one another by relative displacement of the module and the holder in a direction parallel to the straight lines of the end faces and the inputs and outputs, the end faces of the fibers and the assigned inputs and outputs are centered relative to one another.

15. An arrangement according to claim 14, wherein the lateral limiting surface of the groove extends obliquely at an angle to the bearing surface.

* * * * *